Oct. 27, 1970 O. KOHL 3,536,857

MAGNETIC HEAD WITH REFERENCE FOIL

Filed Nov. 7, 1967

INVENTOR.
OTHMAR KOHL

BY [signature]

AGENT 3,536,857
Patented Oct. 27, 1970

3,536,857

MAGNETIC HEAD WITH REFERENCE FOIL

Othmar Kohl, Vienna, Austria, assignor, by mesne assignments, to U.S. Philips Corporation, New York, N.Y., a corporation of Delaware Filed Nov. 7, 1967, Ser. No. 681,454
Claims priority, application Austria, Nov. 18, 1966, A 10,677/66
Int. Cl. G11b *5/24*
U.S. Cl. 179—100.2 12 Claims

ABSTRACT OF THE DISCLOSURE

A magnetic head structure having an electrically referenced non-magnetic gap forming foil is constructed by providing a recess in one of the head foil piece side faces. The foil projects into the recess and is mounted to the pole piece side face by means of an electrically conductive fixing agent. Since the foil is now readily accessible, a reference potential connection can be formed outside of the head. A resilient element such as a screen or brace may be provided for holding the head to a chassis which is at reference potential.

Figure 1:
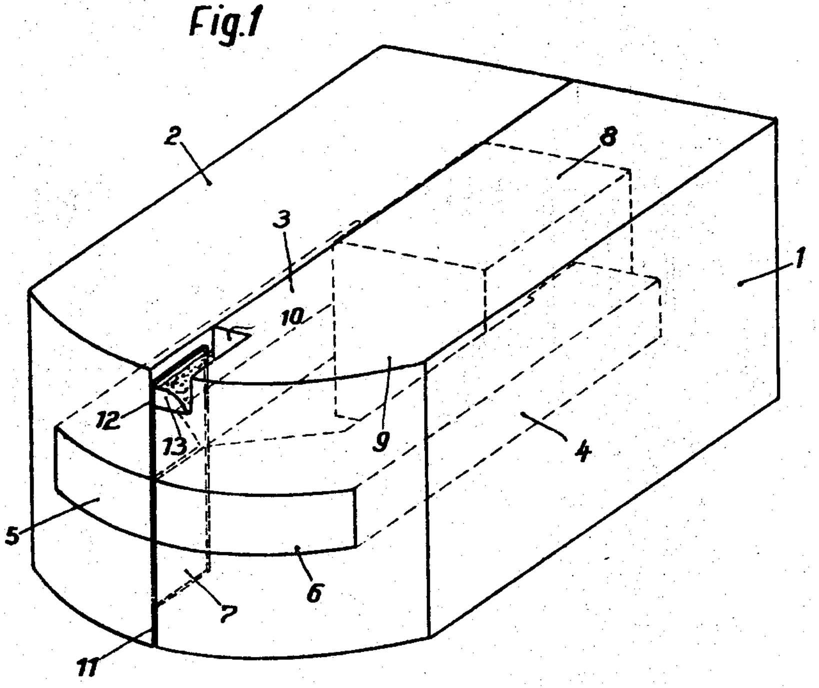

The invention relates to a magnetic head in which the parts of the core of the magnetic circuit or circuits accommodated in halves of the housing consisting of insulating material can be connected to a reference potential through the metal foil forming the effective gap. The result of this measure is that the core-parts of the magnetic circuits cannot be charged electrically and consequently cannot produce disturbances of the record carrier moved along the head. In prior art heads, it is known to manufacture the connection of the gap foil to a reference potential in such a way that a connection wire is soldered to the foil, conducted out through the housing of the head, and subsequently connected to the corresponding reference potential. Since, however, very thin metal strips, generally having a thickness of a few microns, are used as gap foils, making a soldered joint with such a foil is extremely difficult, particularly because the material of the foil melts away easily or a soldered connection is not formed. Furthermore, such a measure requires comparatively a lot of space, in particular for conducting the connection wire out of the head, which likewise presents difficulties when the heads are very small.

The invention avoids said difficulties in a simple manner in that the foil in the plane of the effective gap extends from said gap to at least one side face of the halves of the housing, said side face comprising a recess in which the foil projects and in which, after uniting the halves of the housing, the foil is held by means of an electrically conductive fixing agent, for example, conductive silver, serving to make the connection to the reference potential. In this manner a connection point is formed at the outside on the housing of the head, which is in a conductive connection with the parts of the core, said point being readily accessible and capable of being connected to the reference potential in a variety of manners.

The conductive fixing agent is preferably provided on the side face in question to above the recess. The connection can be made to the chassis which is at reference potential when the head is secured to the chassis, for example, by means of a metal brace or by accommodating in a metal screening housing which can be secured to the chassis and the like. Of course the connection of the head to the chassis needs not necessarily be made with a metallic part but, for example, the head with the side face on which the conductive fixing agent is located may be arranged on the chassis so that the conductive connection between the two parts is made immediately.

It has also proved of advantage, if a resilient element is provided between the metal connection component, for example, a brace, screening housing, or the like, for holding the head to the chassis which is at reference potential, and the side face of the head which comprises the recess. The resilient element comprises an arm which extends in the recess and contacts the fixing agent. In this case the resilient element and the connection component may advatageously be constructed as one unit.

In this manner, also the parts of the core are automatically conductively connected to the chassis of the apparatus when the head is secured to the chassis which is at a reference potential. Of course, for this purpose alternative solutions are possible, for example, the screening housing comprises a soldering eyelet which can be connected to the reference potential by means of a connection wire.

Figure 2:
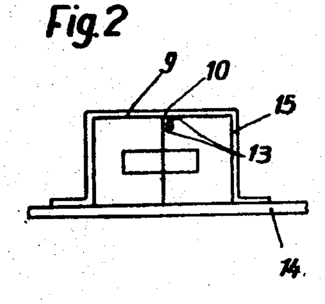
Figure 3:
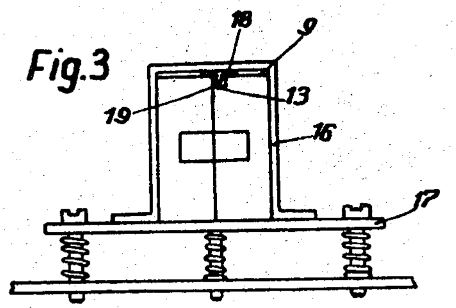

In order that the invention may readily be carried into effect, a few examples thereof will now be described in greater detail, by way of example, with reference to the accompanying drawing, in which FIG. 1 is a cross-sectional view of a head according ot the invention, and FIGS. 2 and 3 show different connections of such a head ot the chassis of the apparatus.

Referring now to FIG.1, reference numerals 1 and 2 denote halves of a housing in which the parts 3 and 4 of the core of a magnetic circuit are accommodated. Between the pole shoes 5 and 6 of the core-parts the effective gap is formed by the interposition of a gap foil 7. The ends of the core-parts opposite to the pole shoes project in a coil 8. Assembling the halves of the housing may be effected, for example, by filling the interior space of the united halves of the housing with a filler.

According to the invention, the side face 9 of the half 1 of the housing comprises a recess 10 in which the end 12 of the gap foil 7 projects which extends in the plane 11 of the gap and is in a conductive contact with the core parts 3 and 4. After assembling the halves of the housing the said end 12 of the gap foil is secured in the recess by means of an electrically conducting fixing agent 13. For this purpose, for example, a quantity of conductive silver which hardens in air is provided in the recess 10 so that an electrically conductive lining is formed which adheres both to the wall of the recess 10 and to the gap foil. Of course, other conductive fixing agents instead of conductive silver may be used, for example, a graphite suspension hardening in air which is commercially available as "Hydrokollag."

This lining which is readily accessible on the outside of the magnetic head is now available for providing contacts for the connection to the reference potential. FIG. 2 shows a particularly simple measure for manufacturing the conductive connection of the above-described lining to the chassis of the apparatus which is normally at reference potential, or a head supporting plate which is provided on such a chassis and may be movable, if required. For this purpose, the conductive fixing agent is provided not only in the recess 10 of the head but projecting therefrom also on the side face 9. If the head provided on the chassis 14 is secured thereto by means of a metal brace 15 which is in contact with the lining on the side face 9, a conductive connection to the chassis is automatically obtained.

FIG. 3 shows a different type of connection of the head to the chassis which likewise forms a conductive connection between the said head and the fixing agent. In this example, the head is accommodated in a screening housing 16 which, by means of a metal supporting member 17, is adjustably secured to the chassis in normal manner for adjusting the position of the effective gap of the head.

Between the screening housing 16 and the side face 9 of the head, a resilient plate 18 is provided which comprises an arm 19 which projects in the recess 10 and contacts the fixing agent. The arm 19 may advantageously also be formed immediately from the screening housing, for example, in that it is formed by a lug bent from the said housing.

Of course the invention is not restricted to a monotrack head but it may analogously be used also in the case of a multitrack head or, in general, in heads having a plurality of gaps. Furthermore, for example, each half of the housing may comprise a recess or, in addition, the side face of a half of the housing opposite to the side face 9 may likewise comprise a recess and the gap foil may be secured in both recesses. As regards the manner in which the fixing agent is connected to the reference potential also, various measures are possible, as described, so that a series of variations of the above-described possibilities are possible without departing from the scope of the invention.

What is claimed is:

1. A magnetic head comprising a magnetic core having a non-magnetic gap formed by a metal foil, said core being enclosed in an insulated housing having a recessed portion in the gap area, said foil extending from the plane of said non-magnetic gap and projecting in said recessed portion of said housing, a conductive fixing agent for electrically contacting said foil at said projection in said recess and fixing said foil in position to said housing and means for connecting a reference potential to said fixing agent for electrically contacting said foil.

2. A magnetic head as claimed in claim 1 wherein said conductive fixing agent extends above said recessed portion, said head being connected to a chassis by means of a metal connection component secured to said chassis and contacting said conductive fixing agent, thereby establishing a connection to the chassis which is at reference potential.

3. The combination of claim 2 wherein said metal connection component is a metal brace clamping said head to said chassis.

4. The combination of claim 2 wherein said metal connection component is a metal screen housing clamping said head to said chassis.

5. A magnetic head as claimed in claim 2 wherein a resilient element is provided between said metal connection component and said recessed portion of said housing, said resilient element comprising an arm one end of which extends in the recess and contacts said fixing agent and the other end of which contacts said connection component.

6. A magnetic head as claimed in claim 5 wherein said resilient element and said connection component are one unit.

7. A magnetic head comprising a housing of insulating material, first and second core halves separated by an effective gap containing a metal foil, an insulating housing having first and second halves, one of said insulated housing halves containing a recessed portion in the gap area at an outer edge thereof, said metal foil extending beyond said gap into said recessed portion, an electrically conductive fixing agent positioned in said recessed portion and electrically contacting said foil and holding said foil in position in said gap, and means for electrically connecting a reference potential to said agent, thereby establishing a reference potential in said foil.

8. A magnetic head as claimed in claim 7 wherein said conductive fixing agent extends above said recessed portion, said head being connected to a chassis by means of a metal connection component secured to said chassis and contacting said conductive fixing agent, thereby establishing a connection to the chassis which is at reference potential.

9. The combination of claim 8 wherein said metal connection component is a metal brace clamping said head to said chassis.

10. The combination of claim 8 wherein said metal connection component is a metal screen housing clamping said head to said chassis.

11. A magnetic head as claimed in claim 8 wherein a resilient element is provided between said metal connection component and said recessed portion of said housing said resilient element comprising an arm one end of which extends in the recess and contacts said fixing agent and the other end of which contacts said connection component.

12. A magnetic head as claimed in claim 11 wherein said resilient element and said connection component are one unit.

References Cited

UNITED STATES PATENTS

| | | | |
|---|---|---|---|
| 2,628,286 | 2/1953 | Rettinger | 179—100.2 |
| 2,668,878 | 2/1954 | Munroe | 179—100.2 |
| 2,900,451 | 8/1959 | Havstad | 179—100.2 |
| 3,079,467 | 2/1963 | Rettinger | 179—100.2 |

JAMES W. MOFFITT, Primary Examiner

R. S. TUPPER, Assistant Examiner